No. 724,297. PATENTED MAR. 31, 1903.
W. V. KING.
TYPE WRITER ATTACHMENT.
APPLICATION FILED APR. 23, 1902.
NO MODEL.
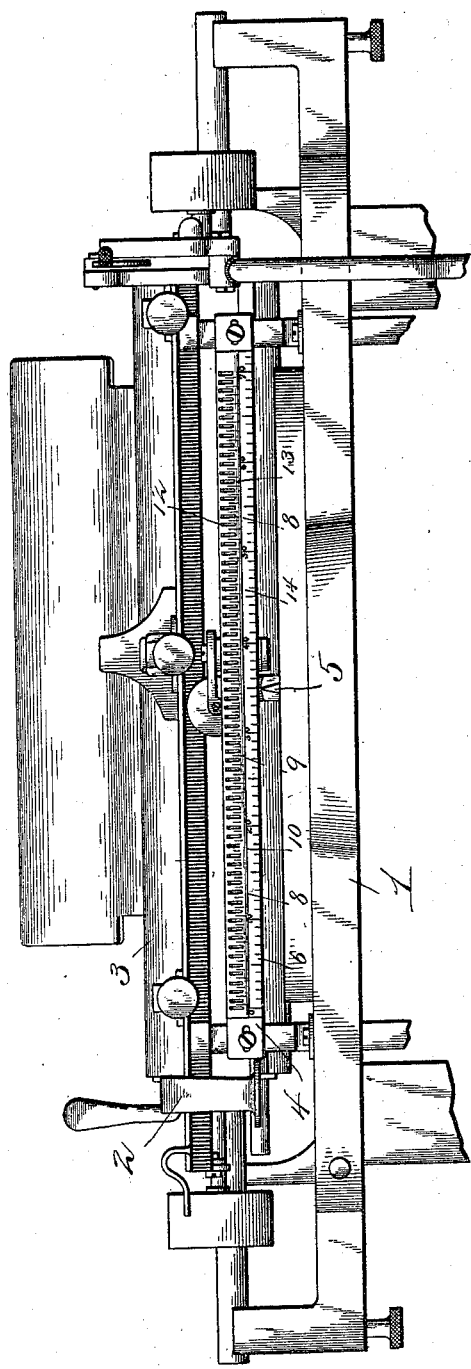
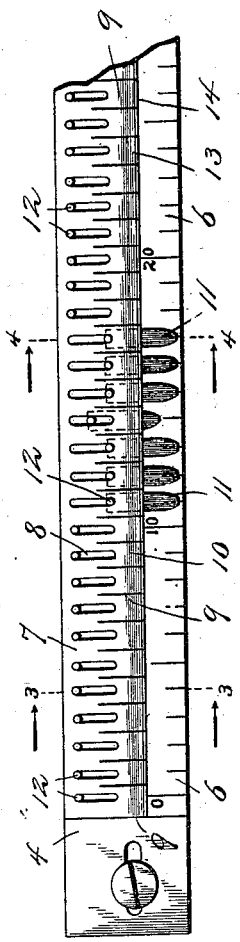
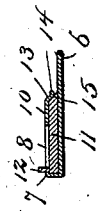
Witnesses
Harry L. Ames.
Chas. S. Hyer.
Inventor
William V. King.
By Victor J. Evans
Attorney

UNITED STATES PATENT OFFICE.

WILLIAM V. KING, OF WACO, TEXAS.

TYPE-WRITER ATTACHMENT.

SPECIFICATION forming part of Letters Patent No. 724,297, dated March 31, 1903.

Application filed April 23, 1902. Serial No. 104,356. (No model.)

*To all whom it may concern:*

Be it known that I, WILLIAM V. KING, a citizen of the United States, residing at Waco, in the county of McLennan and State of Texas, have invented new and useful Improvements in Type-Writer Attachments, of which the following is a specification.

This invention relates to attachments for type-writing machines, and particularly refers to a scale for assisting operators in producing tabulations or statements.

In using the general form of type-writing machine, and especially those which do not have the printed work "in sight," operators meet with considerable trouble when performing statement or tabulation work in arranging the columns of figures exactly under each other without frequently raising the carriage or turning the platen and "sighting," and especially is this true where there are more than one column of figures to be printed. On the preferred forms of type-writing machines as now used the visible scale at the front is attached to and moves with the carriage, and coacting therewith is a stationary pointer, the scale serving to accurately define the location of letters at different points that may be desired throughout a line of printed matter. This is a very simple operation and well understood in ordinary copy-work or type-writing execution; but in statement or tabulation work, where it is desired to copy several columns of figures representing dollars and cents, it is difficult to exactly position the several figures, particularly when the dollars run up to thousands or millions. It is perhaps easy enough to arrange the first line; but when the operator begins to copy the lines that follow and wishes to dispose cents under cents and dollars under dollars, keeping the columns exactly straight, tedious obstruction to expeditious work will be encountered, and under the ordinary methods it is necessary to either raise the carriage or platen at least once for every item in each column in order to properly place the figures or to mark the scale where the columns begin and end, so that the pointer of the machine will indicate where the type are to strike to arrive at an accurate alinement. The first of these common methods requires a loss of time, and the other method is very unsatisfactory because the scales are not made to receive marks.

The present invention is intended to conveniently and practically arrive at the result sought and provide means whereby an operator may know positively just where to stop the carriage in order to print a figure in any line of any column desired. Tabulators of different styles and construction have already been produced; but most of these embody means for releasing and stopping the carriage at different points, whereas the present improvement does not in the least interfere with the motion of the carriage, nor does it interpose complex mechanism that is liable to become impaired in view of the delicacy that would naturally exist in so small a structure.

The essential feature, generally considered, of the present attachment is its adaptation for use on a modern type-writer and its capability of adjustment so that it may be used on a number of different makes of machines either as a scale complete in itself or as an attachment to the regular scale.

A further important feature of the improvement is that every space or division of the scale will have its own separate sliding indicator, which may be pushed up out of sight or exposed for use at the will of the operator, and the parts are so arranged that they will not only show different margins or columns, but also the subdivisions of columns—for instance, cents from dollars, hundreds from thousands, &c.

A further advantage is that the attachment being light and compact, as well as ornamental, when placed on the type-writer will not increase the jar, vibration, or noise caused by the use of a machine having the same thereon and also embodies means through the medium of a distinctive color different from the remaining portion of the scale, whereby an operator can readily and quickly distinguish with the eye the indicators when extended for use.

The accompanying drawings show the improved device applied to one form of machine, and therein—

Figure 1 designates a front elevation of the upper portion of a type-writing machine embodying the carriage and showing the improved scale attachment in operative position. Fig. 2 is an enlarged plan view of a portion of the scale attachment, showing a part of the sliding indicators extended. Fig. 3 is a transverse vertical section on the line 3 3, Fig. 2. Fig. 4 is a transverse vertical section on the line 4 4, Fig. 2.

Similar numerals of reference are employed to indicate corresponding parts in the several views.

The numeral 1 designates the frame of a type-writing machine of ordinary form, on which a carriage 2 is slidably mounted, and embodies a platen 3 and a scale 4, which moves in operative conjunction to a stationary pointer 5. This arrangement of the scale is preferred because the majority of the present forms of type-writing machines have the visible scale movable with the carriage; but it is obvious that the scale could be stationarily applied to a part of the frame, as in some makes of machines, and the pointer movable with the carriage. The scale 4, embodying the features of the improvement, has slotted ends for justifying purposes and is divided into letter-spaces by lines of demarcation running from "0" to "72," or the said scale may indicate less or a greater number of letter-spaces, in accordance with the general dimensions of the machine. The preferred form of the improved scale or scale attachment comprises a metal plate 6, having a thin sheet-steel or analogous metallic partial covering 7 secured thereto and extending over to the front from one edge of said plate 6. The said covering 7 acts as a sheathing, as well as a means for holding parts, which will be presently set forth, and is provided with a series of slots 8, equal in number to the divisions of the scale. Between the location of the slots 8, which are of equal length and disposed in parallel relation, are slits 9, that form spring-tongues 10 in advance of or below the said slots. With each tongue 10 a slidable indicator 11 coöperates and has a stud 12 projecting through the adjacent corresponding slot 8. These indicators 11 are all of equal length and of a distinctive color, such as red or any other shade that will attract the eye of the operator. The studs 12 prevent the indicators from becoming separated from the attachment and the tongues 10 act to frictionally hold the indicators with such degree of firmness as to prevent them from moving after they are adjusted as may be desired in order to avoid confusion or inaccuracy in the use of the said indicators. The free edge of the covering or sheathing 7 is struck inwardly to form a beveled retaining-lip 13, which is regularly continued through all the tongues 10 and is terminally outstruck, as at 14, to avoid abrasion of the slidable indicators 11, said indicators having beveled edges 15, adapted to be engaged by the inwardly-beveled lip 13 when fully inclosed under the covering or sheathing 7.

In adjusting the indicators they are fully projected in series of three to designate increasing denominations, and between the series a portion of the said indicators are only partially projected to designate the position of commas and a decimal-point. It will be seen that the slidable indicators when projected coincide with the divisions or marks on the main scale which designate the letter-spaces throughout the length of a line, and in statement or tabulation work it is only necessary that the operator move the carriage to the indicator representing units, tens, hundreds, thousands, ten thousands, hundred thousands, &c., as well as the corresponding denominations on the right of the decimal-point, to arrive at an accurate disposition of numerals, and knowing the positions of the several denominations through the medium of the several indicators elevation of the carriage or platen and sighting will be avoided with a consequent expedition in the completion of the work. By the use of the slidable indicators accuracy in statement or tabulation work will also result, and an increase or decrease in the denominations may be readily accommodated by projecting a greater number of the indicators than originally brought to view or pushing a portion of said indicators under the covering or sheathing.

By coloring the indicators the operator will be guided in placing the carriage on the scale through the medium of the pointer at any point in a column desired, and in addition to ordinary statement and tabulation work it is obvious that the indicators can be conveniently employed for producing various kinds of fanciful drop-letter type-writing or sheet ornamentation or division. It is proposed to construct the indicators of any suitable material, and they may be held in operative relation to an ordinary scale or the scale may be manufactured in the first instance with the same as a part thereof.

The indicators will be preferably operated by the studs 12, which project far enough outward for engagement by the hand of the operator, and the beveled edge of the several spring-tongues bearing upon the projected indicators will hold them against accidental movement. The indicators may also be drawn or pushed under the covering or sheathing 7 by means of the studs 12, and when in this position the beveled edges of the spring-tongues bearing against the correspondingly-beveled edges of the indicators will prevent the latter from slipping out of place.

Having thus described the invention, what is claimed as new is—

1. A scale having regular divisions designated thereon, and color-indicators transversely slidable over and fully in contact with the upper surface of the scale, the said indicators being movable in a plane parallel with the upper surface of the scale and projectible partially or fully over the latter, and a resilient holding means extending partially over the scale and engaging the indicators, the latter moving between the said means and the upper surface of the scale.

2. A scale having divisions designated thereon, a resilient covering extending partially over the scale, and indicators slidably held by and under the said covering and adapted to coöperate with said divisions.

3. A scale having divisions designated thereon, a resilient covering extending over a portion of the scale, and slidable indicators disposed under and having projections movable in the said covering and adapted to coöperate with the said divisions.

4. A scale having divisions designated thereon, a resilient covering extending partially over the scale and provided with a series of slots, and indicators disposed under the said covering and having projections engaging the said slots, the said indicators coöperating with said divisions.

5. A scale having divisions designated thereon, a covering extending over a portion of the scale and formed with a plurality of yielding tongues, and slidable indicators to coöperate with said divisions engaged by the said tongues.

6. A scale having regular divisions designated thereon, a covering extending partially over the scale and formed with slots and yielding tongues, and indicators to coöperate with said divisions engaged by the said tongues and having projections movable in the slots.

7. A scale having divisions designated thereon, a covering extending partially over the scale, and provided with a series of transversely-extending slits to form tongues, and slidable indicators engaged by the said tongues.

8. A scale having divisions designated thereon, a resilient covering extending partially over the scale and having an inwardly-beveled free edge, and indicators engaging the said covering and adapted to be held under the latter.

9. A scale having divisions designated thereon, a covering extending partially over the scale and provided with an inwardly-beveled free edge which is formed with a series of yielding tongues, and a series of slidable indicators engaged by the said tongues and adapted to be held under the covering.

In testimony whereof I affix my signature in presence of two witnesses.

WILLIAM V. KING.

Witnesses:
  S. H. McCARTNEY,
  DON MARACHE.